(No Model.)
A. J. BURNS.
PNEUMATIC TIRE FOR BICYCLES.
No. 511,999. Patented Jan. 2, 1894.
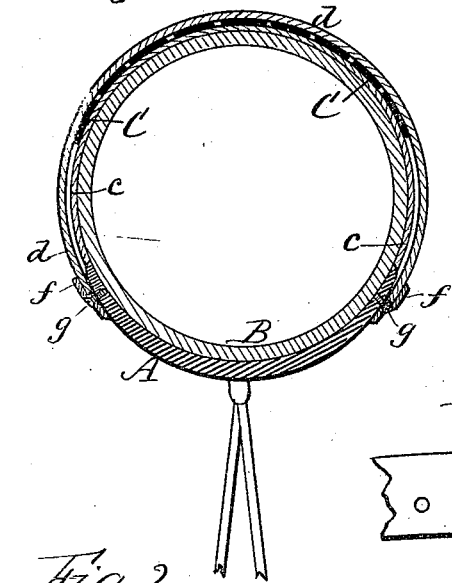
Fig. 1.
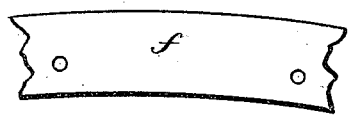
Fig. 4.
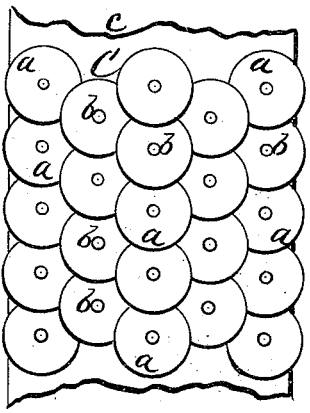
Fig. 2.
Fig. 3.
Witnesses.
Austin S. Smith
C. G. Cranwell
Inventor.
Albert J. Burns,
pr R. T. Osgood,
Atty.
THE NATIONAL LITHOGRAPHING COMPANY,
WASHINGTON, D. C.

UNITED STATES PATENT OFFICE.

ALBERT J. BURNS, OF FAIRPORT, NEW YORK.

PNEUMATIC TIRE FOR BICYCLES.

SPECIFICATION forming part of Letters Patent No. 511,999, dated January 2, 1894.

Application filed July 9, 1892. Serial No. 439,443. (No model.)

*To all whom it may concern:*

Be it known that I, ALBERT J. BURNS, of Fairport, in the county of Monroe and State of New York, have invented a certain new and useful Improvement in Pneumatic Tires for Bicycles; and I do hereby declare that the following is a full, clear, and exact description of the same, reference being had to the drawings accompanying this specification.

My improvement relates to pneumatic tires for bicycles and other vehicles, and consists of a flexible band or tube provided with a series of overlapping plates arranged as hereinafter described and claimed.

In the drawings—Figure 1 is a cross section of the pneumatic tire and the rim of the wheel, showing my improvement. Fig. 2 is a plan view of a portion of the metallic surface which is interposed between the tube and outer covering, the same being shown in this figure as spread out in a flat form. Fig. 3 is a vertical section showing one of the metallic plates attached to the supporting lining. Fig. 4, is a side elevation of one of the clamps.

My improvement is applicable to bicycle wheels and all wheels of a similar nature that are provided with pneumatic tires.

The object is to prevent puncturing of the tire in running over stones and other sharp projections.

A indicates the rim of the wheel and B the pneumatic tire, which, in themselves, are of ordinary form and construction.

C is the metallic surface, in which a series of small metallic plates $a\ a$ are laid so as to overlap on all sides, making a continuous surface, and secured by rivets $b\ b$ to an under lining $c$. This is laid over the tread portion of the tire as shown in Fig. 1, and is then covered by the ordinary outer covering $d$. Each of these plates yields under action and has free motion, and the tire retains its usual elasticity. The plates may be made of any suitable metal, but aluminum is preferable, owing to its extreme lightness. The lining $c$ is not indispensable, as the metallic covering can be attached to the inner side of the outer covering $d$, and it may be attached by other means than riveting. The plates are arranged in parallel rows as shown in Fig. 2, the first layer being on the middle line of the tire and the other rows on either side of same. The plates are also attached in their center, by which free action is attained.

F is a clamp for holding the outer covering $d$ in contact with the rim of the wheel. It is in the form of a circular flange to fit the rim, and is attached thereto by screws $g\ g$. The edges of the outer covering $d$ are fitted between the clamp and the rim, and the clamp is then tightened by turning up the screws. The clamp is preferably made in sections or segments, by which means, when repairs are required, a portion only of the outer covering may be laid open to make the repairs at any particular point.

Having described my invention, what I claim as new, and desire to secure by Letters Patent, is—

1. In a pneumatic tire, a flexible band or tube having a series of overlapping plates on the medial line of said band or tube, and other series of plates arranged in parallel rows on either side of said medial row, as specified.

2. A flexible band or tube having a series of overlapping plates arranged in parallel rows, each plate being centrally and separately secured to the band or tube, as and for the purpose specified.

In witness whereof I have hereunto signed my name in the presence of two subscribing witnesses.

ALBERT J. BURNS.

Witnesses:
R. F. OSGOOD,
GEO. P. DRAPER.